United States Patent [19]
Cha

[11] Patent Number: 5,125,489
[45] Date of Patent: Jun. 30, 1992

[54] HIGH-TORQUE DUAL-PURPOSE HUB ASSEMBLY FOR THE REAR WHEEL OF A MULTISPEED BICYCLE

[76] Inventor: Pyong I. Cha, 324 S. Smokeridge Ter., Anaheim, Calif. 92807

[21] Appl. No.: 594,695

[22] Filed: Oct. 9, 1990

[51] Int. Cl.$^5$ .............................................. F16D 41/28
[52] U.S. Cl. ..................................... 192/6 R; 192/44; 192/45; 192/64
[58] Field of Search ...................... 192/44, 45, 64, 6 R

[56] References Cited

U.S. PATENT DOCUMENTS

| | | | |
|---|---|---|---|
| 2,211,053 | 8/1940 | Critchfield | 192/45 |
| 3,972,245 | 8/1976 | Allen | 192/64 |
| 4,102,215 | 7/1978 | Nagano et al. | 192/64 |
| 4,674,617 | 6/1987 | Nagano | 192/64 |
| 4,838,122 | 6/1989 | Takamiya et al. | 192/64 |

FOREIGN PATENT DOCUMENTS

| | | | |
|---|---|---|---|
| 342761 | 9/1904 | France | 192/64 |
| 528709 | 11/1921 | France | 192/45 |
| 535813 | 4/1922 | France | 192/45 |
| 822080 | 5/1938 | France | 192/64 |

*Primary Examiner*—Leslie A. Braun
*Assistant Examiner*—Nicholas Whitelaw
*Attorney, Agent, or Firm*—Richard L. Gausewitz

[57] ABSTRACT

A cylindrical cassette body contains the movable balls and ball-biasing springs of a ball-type clutch. The balls ride in grooves in an element disposed within the body. Exteriorly, the cog body has longitudinal keyways to receive internal teeth of a set of cogs all of which have the same internal diameter. The exterior of the body is also threaded and is selectively employed in combination with a free-wheeling cog adapter having two different outer diameters, such adapter receiving a set of cogs having two different inner diameters.

5 Claims, 3 Drawing Sheets

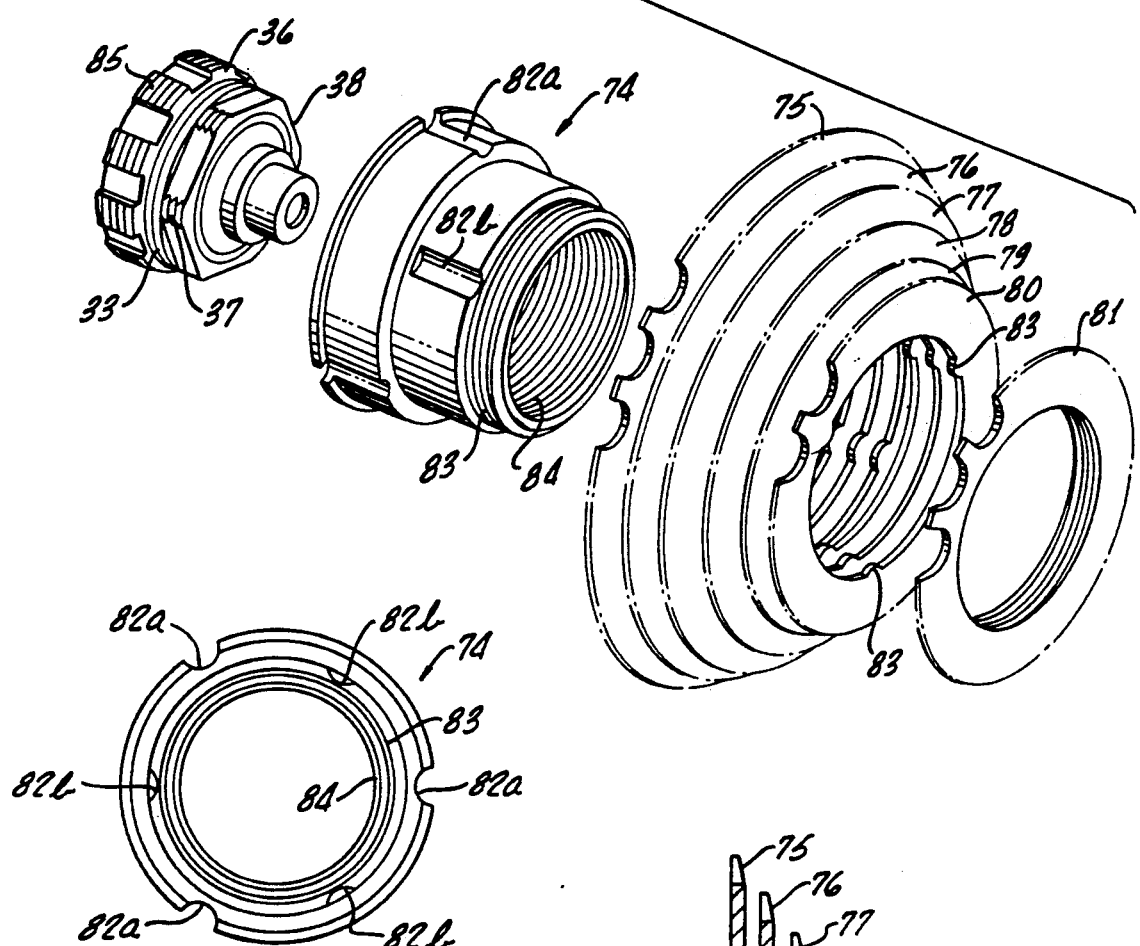
FIG. 5.
FIG. 6.
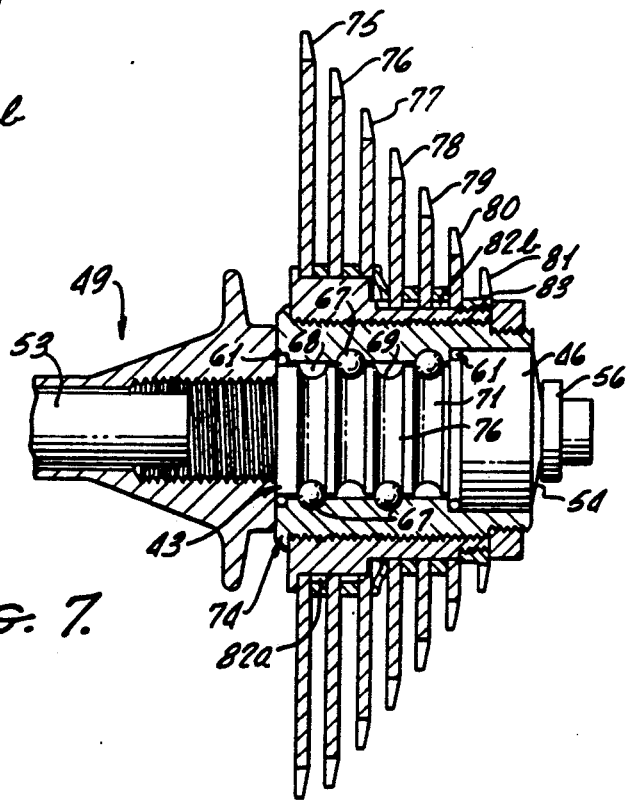
FIG. 7.

HIGH-TORQUE DUAL-PURPOSE HUB ASSEMBLY FOR THE REAR WHEEL OF A MULTISPEED BICYCLE

BACKGROUND OF THE INVENTION

For decades it has been conventional to employ stepped free-wheel cog adapters that threaded onto the rear hubs of multispeed bicycles. Because the external surfaces of such cog adapters were stepped, the cogs had to have two different internal diameters, one internal diameter for the larger-diameter region of the cog body and a smaller internal diameter for the smaller region thereof. Because of this, and in order to achieve desired combinations of cogs, it was sometimes necessary for the bicyclist to have two different (for example) "number 17" cogs, and other cogs, one with one internal diameter and another with a different internal diameter.

In the mid-1980s, a company started to sell a "free hub" or cassette, having a single external diameter. Thus, all of the cogs could have the same internal diameter and it was possible to achieve various combinations of cogs without the necessity of having two of any particular cog (or cogs).

The above-indicated hub assemblies are conventionally of the pawl and ratchet type, which type generated the common clicking noise of the rear hubs of bicycles. Attempts have been made to achieve hubs having no such clicking noise, and having other benefits. This was and is done by employing pin-type roller clutches. However, and especially for cassettes or free hubs, the external diameters of which are the same throughout, and are relatively small, such pin-type roller clutches do not generate sufficient torque for certain important applications. Stated otherwise, they are insufficiently strong for such applications.

SUMMARY OF THE INVENTION

The present invention provides a combination cassette body and ball clutch that is extremely strong in relation to its diameter, that is completely silent, and that achieves immediate drive.

The present invention also provides a combination cassette body, ball clutch and rear hub for a multispeed bicycle, characterized by the above-indicated high-torque capability for its diameter, and by silence and immediate torque generation.

In accordance with another aspect of the present invention, there is provided a cassette body in combination with a roller clutch, which body is adapted to receive a set of cogs the internal diameters of which are all the same. Furthermore, such cassette body is adapted to receive, instead of such last-mentioned cogs, a cog adapter of the free-wheeling type having a stepped external configuration, the latter adapter being adapted to receive cogs having different internal diameters.

The present invention also provides the combination stated in the preceding paragraph, and further in combination with the rear hub of a multispeed bicycle.

BRIEF DESCRIPTION OF THE DRAWINGS

FIG. 5 is an exploded view illustrating the cassette body of FIG. 4 in combination with a free-wheel cog adapter and associated cogs;

FIG. 6 is an end view of a typical free-wheel cog adapter; and

FIG. 7 is a longitudinal sectional view showing the parts of FIG. 5 in assembled condition.

DETAILED DESCRIPTION OF THE INVENTION

Figure 1:
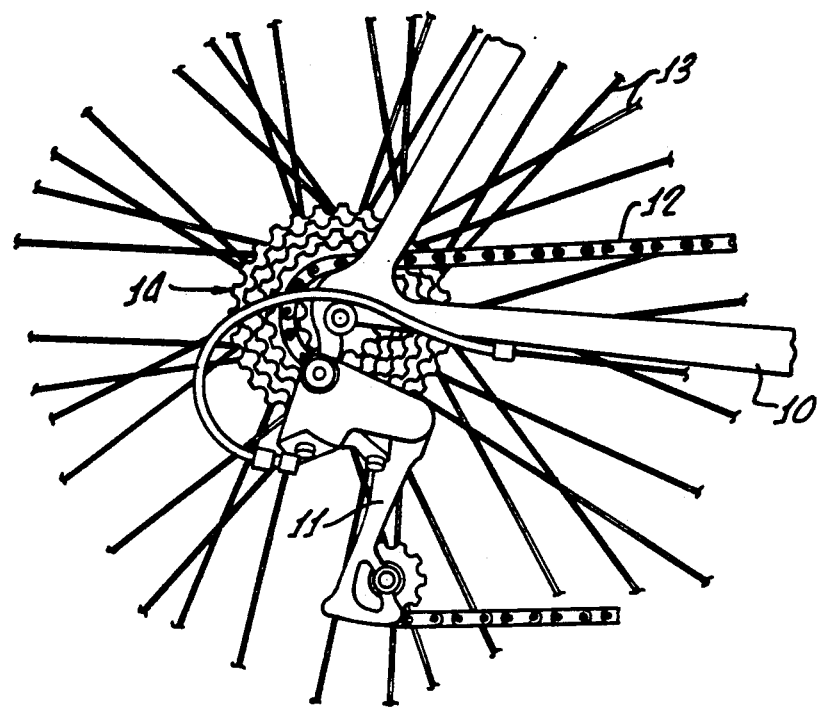
FIG. 1 is a fragmentary side elevational view of a rear wheel portion of a multispeed bicycle.
Figure 2:
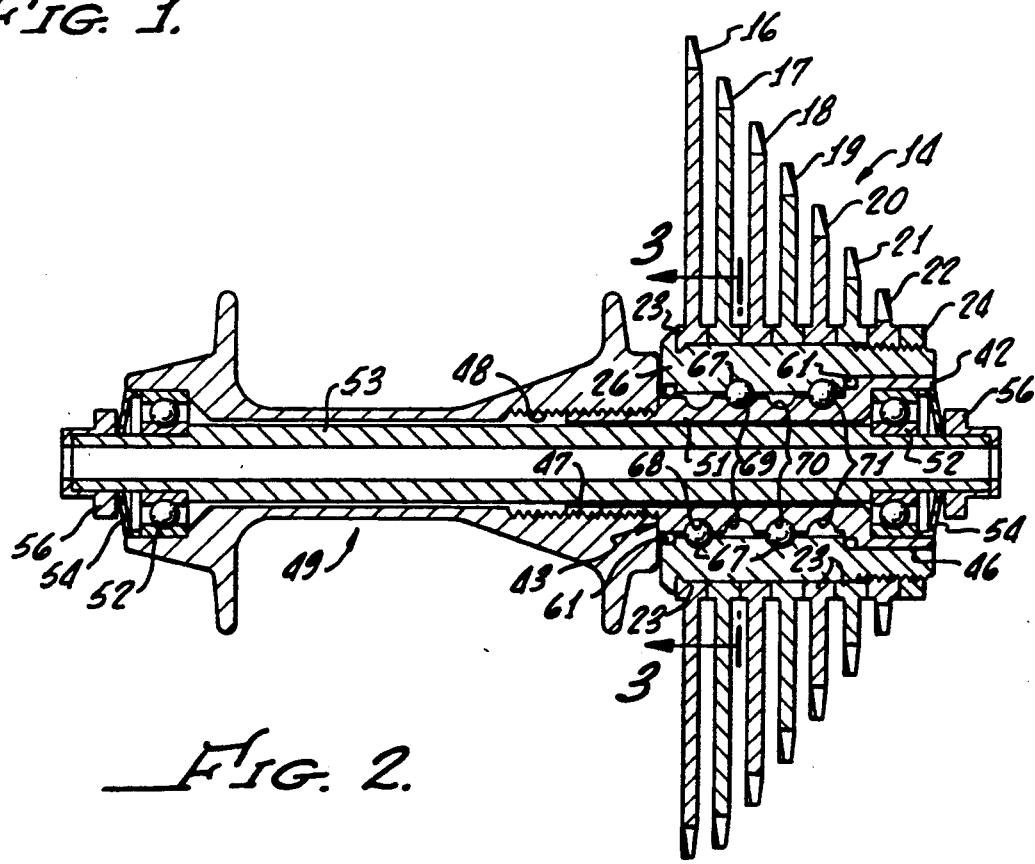
FIG. 2 is a transverse sectional view taken along the axle of the showing of FIG. 1, showings of the chain, forks, spokes and derailleur being omitted.

Referring first to FIG. 1, there is shown a fork 10, a derailleur 11, chain 12, spokes 13, and a set 14 of cogs. Referring next to FIG. 2, the illustrated cog set 14 comprises seven cogs 16–22, inclusive, having different diameters and numbers of teeth so as to cooperate with chain 12 with different mechanical advantages.

Cogs 15–21, inclusive, are maintained separate from each other by the illustrated cog hubs 23 or (alternatively) by separate spacers. The outer end cog, number 22, is always fixedly secured to its hub or spacer 24. It is to be understood that the inner six cogs 16–21, may, if desired, be prebolted together so as to go on as an assembly. However, the outer cog, number 22, is put on 20 separately after mounting of the inner six cogs 16–21 as described below. Different diameters of cogs may be employed as desired by the operator.

Figure 3:
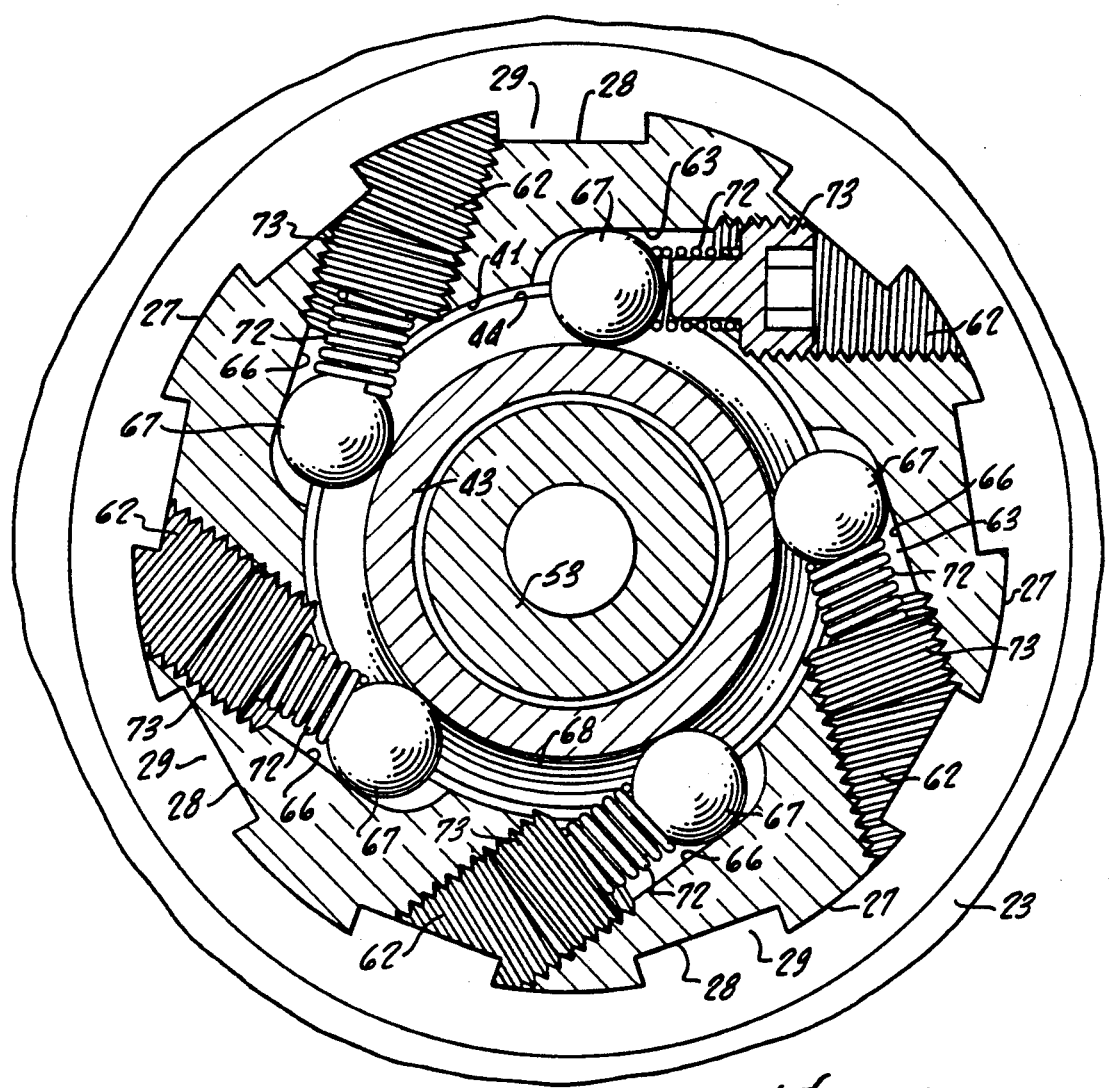
FIG. 3 is a greatly enlarged sectional view taken on line 3—3 of FIG. 2.
Figure 4:
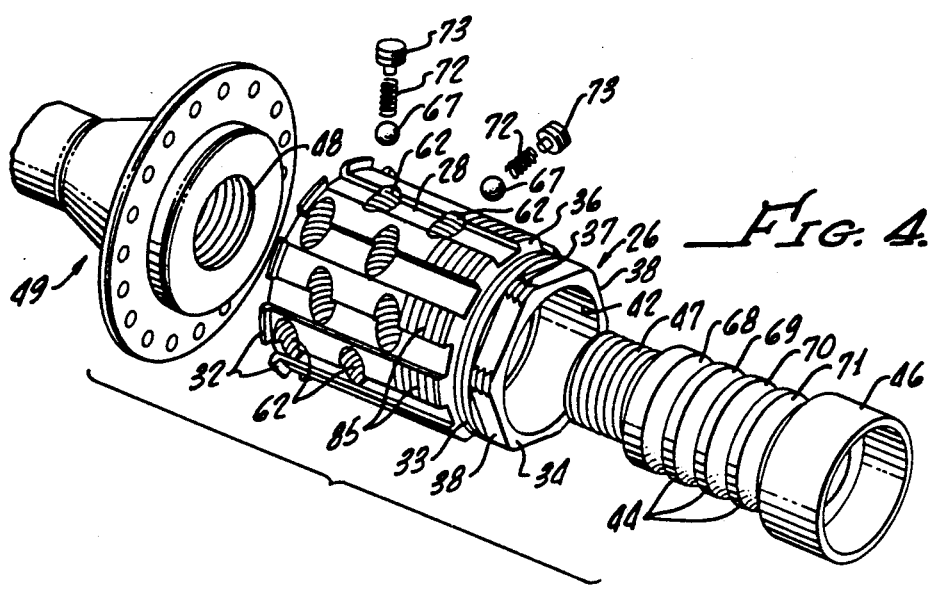
FIG. 4 is an exploded isometric view showing the cassette body in association with the ball clutch and bicycle wheel hub.

Referring next to FIGS. 3 and 4, the cogs 16–22 (only one of which is shown in these figures) are mounted on a cylindrical body 26 which is called a cassette body in the illustrated embodiment. The exterior cylindrical surface 27 of body 26 is provided with a multiplicity of circumferentially-spaced shallow keyways 28 that are parallel to each other and to the axis of body 26. Keyways 28 receive splines or keys 29 that are formed integrally at the 30 central openings of the inner six cogs 16–21, the splines or keys 29 on one such cog being shown in FIG. 3. It is to be understood that the splines or keys on the remaining ones of the six inner cogs correspond to what is shown in FIG. 3.

The set 14 of cogs is prevented from shifting off the inner end of cassette body 26 by means of integral stops 32. These are radial wall or flange portions that extend outwardly from the cylindrical surface 27, at regions between keyways 28, at the inner end of the body 26

The hub 24 of the inner cog 22 is not splined but instead is internally threaded. The shape and size of such internal threading are such that the outer cog 22 and its hub 24 may be and are threaded onto the outer end of cassette body 26. The thread for hub 24 is numbered 33 in FIG. 4. This thread 33 has a smaller diameter than that of the threads described below.

Thread 33 is not provided on the main part of the exterior cylindrical surface 27, but instead on a necked-down outer end portion of the body 26 and which is numbered 34. The necking down provides a shoulder 36 located in substantially the same radial plane as the outer ends of the various keyways 28.

The necked-down end region 34 of the body is cylindrical immediately adjacent shoulder 36. Then, outwardly thereof, the outer end of the body is exteriorly generally hexagonal as shown in FIGS. 4 and 5. Furthermore, only spaced corner regions of the exteriorly-hexagonal surface are threaded, as shown as 37. Thus, wrench flats 38 are provided between such exteriorly-threaded corner regions 37 to receive a wrench that is employed to torque the body.

The thread 33 for the outer cog 22, and the threaded corners 37 between wrench flats 38, form a continuous helical thread the diameter of which is just sufficiently small that it does not interfere with mounting of the splines 29 in keyways 28. Thus, the inner cogs 16-21 shift axially over the thread regions 33 and 37 without interference therefrom, and then enter the keyways 28. Thereafter, the outer end cog 22 and its hub 24 are threaded onto the threaded regions 33 and 37 to mount the outer cog 22 on the body and also to hold the inner cogs in position.

Cassette body 26 is provided with a relatively large diameter axial bore 41 (FIG. 3) at the outer end of which is an axial counterbore 42 (FIGS. 2 and 4). A relatively large diameter combination bearing race and clutch-ball race 43 is mounted coaxially in the bore and counterbore 41, 42. At its portion within bore 41, race 43 has surface regions the diameters of which are substantially less large than the diameter of bore 41, as shown at 44 in FIG. 3. At its region within counterbore 42, race 43 has a continuous cylindrical surface 46 that is spaced somewhat inwardly from the cylindrical wall of counterbore 42.

At its inner end, race 43 has an externally threaded neck 47 that threads into an internally threaded bore 48 in the illustrated bicycle wheel hub 49 (FIG. 2). Threading of the neck 47 into the hub 49 continues until a shoulder, at the hub end of race 43, engages the radial end surface of hub 49. Such threading is readily effected because the outer (right in FIG. 2) end of a cylindrical bore 51 in race 43 is hexagonally shaped to receive a Allen wrench.

The bicycle wheel hub 49 and the race 43 are rotatably mounted conjointly on the tubular axle 52 of the bicycle wheel, by bearings next described. These are two roller bearing assemblies 52, one of which is pressed into a counterbore in the left end of hub 49 (FIG. 2). The other ball bearing assembly is pressed into a counterbore in the right end of race 43 (FIG. 2). In each case, the ball bearing assembly is pressed against a shoulder formed near an end of the tubular axle 53 of the bicycle wheel. In each case, a bearing cap 54 is provided, as shown in section in FIG. 2.

Outwardly of each bearing cap, there is a stopper 56 pressed over each end of the axle. The stoppers cooperate with the forks 10 to mount the assembly between the forks 10 of the bicycle. Quick release means, including the usual element that extends through the tubular axle 53, are provided to pull the forks together to thus press against the stoppers 56 and mount the assembly for quick release when desired. Spacers, not shown, may be provided immediately inwardly of the stoppers.

Referring next to a description of the balls and associated grooves, there are two sets of preferably small-diameter balls 61 that rotatably mount the cassette body 26 on race 43 in low-friction ball-bearing relationship. Referring to FIG. 2, the first such set of balls 61 is adjacent the hub 49 of the bicycle wheel, and rides in an annular groove that is formed in the inner end of race 26 in communication with axial bore 41 (FIG. 3). Stated otherwise, the groove for the left set of balls 61 (FIG. 2) is provided by forming a short counterbore at the left end of the bore in body 26. The left set of balls 61 is caged by the outer surface of the race.

The second set of bearing balls 61, shown at the right in FIG. 2, is provided in an annular groove formed in the outer-left corner of the large portion of race 43. Thus, the right balls are caged in position by the inner end of the wall of counterbore 42. The two sets of balls 61 maintain body 26 coaxial with the assembly despite the fact that there are spaces between the surfaces of body 26 and the opposed surfaces of race 43.

There will next be described balls, grooves, etc., which cooperate with the race 43 and cassette body 26 in spherical ball-clutch relationship. This provides a very high-torque, high-strength connection between the body and race when the pedals of the bicycle are being turned forwardly and permits low-friction silent turning of the wheel when the pedals are not being actuated. Furthermore, upon actuation of the pedals the response is substantially immediate, there being no substantial slop or play.

Referring to FIGS. 3 and 4, body 26 is provided in four axially-spaced radial planes with circumferentially spaced bores 62 that are (at least at their inner regions) threaded. The bores 62 in each radial plane are generally tangential to the race 43. Furthermore, the bores 62 in each plane are equally spaced about the axis of the assembly.

The bores in adjacent planes are staggered relative to each other, as shown in FIG. 4, in corresponding ways. Thus, the bores shown at the left in FIG. 4 correspond in circumferential positions to those shown third from left. Also, the bores second from left in FIG. 4 correspond in circumferential positions to those fourth from left. It is to be understood that other numbers of bores could be employed.

At its inner end, each bore 62 communicates with a recess 63 (FIG. 3) which in turn opens through the wall of axial bore 41 of body 26. Each recess has an outer wall portion 66 that is smooth and extends generally tangentially to the race 43. A clutch ball 67 is mounted in each recess 63 and in an annular groove 68, 69, 70 or 71 (FIG. 4) in race 43. Each groove 68-71 is located correspondingly to one set of bores 62 and recesses 63. Thus, the grooves 68-71 lie in radial planes, the centers of the groove corresponding to the centers of recesses 63 and of clutch balls 67.

Each clutch ball 67 is pressed toward the end of its associated recess 63 by a helical compression spring 72, the spring being backed by a set screw 73 threaded into each bore 62, there being a cylindrical spring guide (part of the set screw) around each spring 72.

The diameters of balls 67 are correlated to the radial location of the outer walls 66 of recesses 63, in such manner as to achieve wedging relationships when the operator attempts to rotate cassette body 26 clockwise relative to race 43. Accordingly, torque is transmitted through the balls to the race and thus to the bicycle hub 49. When, on the other hand, no torque is applied by the operator, the race shifts the balls slightly in a direction away from the ends of the recesses, eliminating the wedging relationships and freeing the hub 49 for silent rotation relative to the cassette body 26. When the operator again rotate the cassette body (by means of the pedals, chain and a cog), torque is again instantly transmitted to the race and thus to the hub 29, wheel and tire.

Referring next to FIG. 5, there is shown a free-wheel type cog adapter 74 the external portion of which correspond to any one of many different free-wheel cog adapters in conventional use. Thus, the illustrated cog adapter has but one of man different configurations which could be employed and which are known in the art. Cog adapter 74 (and others, not shown) has at least two different outer diameters adapted to receive cogs 75-81 having correspondingly different internal diameters.

The cog adapters have external longitudinal keyways or grooves 82a and 82b which receive key portions 83 of the cogs 75-80. At its outer end, cog adapter 74 is externally threaded, at 83, to receive an internally threaded cog 80, or associated hub or spacer, which holds the set of cogs on the cog adapter. At its inner end, cog adapter 74 has a radial flange to prevent excessive inward movement of the set of cogs.

In accordance with one aspect of the present invention, cog adapter 74 has an internal thread 84 that mates with an external thread 85 on cassette body 26. Such external thread is present only on the lands between the above-described keyways 28 on the external surface of the cassette body 26.

In operation, when a retailer or bicyclist desires to employ a cassette set 14 of cogs, he or she does not employ the free-wheel cog adapter 74 or the associated cogs 75-81. Instead, cog set 14 is mounted directly on the cassette body 26 as described in detail above. However, if a retailer or operator desires to employ a free-wheel cog adapter and set of cogs, he or she takes the cog adapter 74 and threads it onto the threads 85 on cassette body 26. Then, or previously, the cogs 75-79 are mounted on the cog adapter 4, being maintained in mounted condition by means of the outer end cog 81 which is threaded onto the external end thread 83.

In either case, there is extremely high-strength transmission of torque between the cogs and the race and thus the hub of the bicycle, by means of the balls 67 and associated mechanism. Furthermore, the operation is completely silent and substantially instantaneous.

The foregoing detailed description is to be clearly understood as given by way of illustration and example only, the spirit and scope of this invention being limited solely by the appended claims.

What is claimed is:

1. A high-torque assembly for a multispeed bicycle, said bicycle having a rear wheel, said rear wheel having a rear hub, said high-torque assembly being for said rear hub, said high-torque assembly comprising:
   (a) an elongate generally cylindrical body having a large-diameter coaxial bore therethrough,
      said bore having a wall,
   (b) a generally cylindrical race element mounted coaxially in said bore,
   said race element being adapted to be connected coaxially to said rear hub of said multispeed bicycle,
      said race element being mounted for rotation relative to said body unless such relative rotation is prevented,
         said race element having an outer side that is generally cylindrical and is coaxial with said wall,
         said outer side having a plurality of annular grooves formed therein and spaced from each other axially of said race element,
            each of said annular grooves lying in a plane that is generally perpendicular to the axis of said race element,
   (c) a multiplicity of ball-receiving recesses provided in said body,
      said recesses opening through said wall of said bore,
      said recesses also lying generally in said planes,
         each of said recesses having an outer wall that is generally tangential to said race element,
   (d) a ball provided in each of said recesses,
      each such ball being disposed at its inner portion in one of said annular grooves in said race element,
      each such ball being disposed at its outer portion, outwardly of the one of said annular grooves it is partially in, for engagement with said outer wall of the one of said recesses it is in,
   (e) spring means to bias said balls in a predetermined direction,
      said balls, recesses, grooves, and spring means cooperatively forming a one-way ball clutch preventing rotation of said race element relative to said body in one direction, but permitting rotation of said race element relative to said body in the opposite direction,
   (f) means provided externally on said body to receive a set of cogs for said bicycle, and
   (g) a set of cogs mounted on said cog-receiving means.

2. The invention as claimed in claim 1, in which a multiplicity of bearing balls are provided between said race element and said body to permit low friction rotation of said race element relative to said body in said opposite direction.

3. The invention as claimed in claim 1, in which said assembly is provided in combination with a multispeed bicycle, said bicycle having a rear hub, said assembly being provided in combination with said rear hub of said bicycle, said rear hub having an internally threaded bore coaxially therein in one side thereof, said race element having an externally threaded neck threaded into said bore.

4. The invention as claimed in claim 1, in which said elongate generally cylindrical body has a generally cylindrical external side spaced radially-outwardly from said wall of said bore and being coaxial with said bore and said wall, in which a plurality of shallow keyways are provided longitudinally of said cylindrical body on said external side thereof, said keyways being circumferentially spaced relative to each other, and in which said cogs in said set of cogs have key portions sized to be received in said keyways when said set of cogs are slid onto said body.

5. The invention as claimed in claim 4, in which said body at one end thereof is necked-down by a small amount and is externally threaded to thereby form a thread on said necked-down end of said body, and in which one of said cogs is internally threaded to mate with said thread on said necked-down end, thereby keeping said set of cogs on said body.

* * * * *